United States Patent [19]
Wada

[11] 4,321,626
[45] Mar. 23, 1982

[54] FACSIMILE APPARATUS
[75] Inventor: Yoshinori Wada, Tokyo, Japan
[73] Assignee: Ricoh Company, Ltd., Tokyo, Japan
[21] Appl. No.: 140,375
[22] Filed: Apr. 14, 1980
[30] Foreign Application Priority Data
  Apr. 14, 1979 [JP] Japan .................................. 54-44861
[51] Int. Cl.³ .............................................. H04M 1/00
[52] U.S. Cl. .................................... 358/263; 340/730;
                                                            178/30
[58] Field of Search ............... 340/730, 709, 743, 748;
                                                    358/263; 178/30
[56] References Cited
        U.S. PATENT DOCUMENTS
  3,868,673  2/1975  May, Jr. et al. .................... 340/730
  3,895,375  7/1975  Williams ............................... 178/30
  4,151,562  4/1979  Tregay ................................ 358/263

Primary Examiner—Robert L. Richardson
Assistant Examiner—Edward L. Coles
Attorney, Agent, or Firm—David G. Alexander

[57] ABSTRACT

Character codes having underline bits are read out of a memory (22). A character generator (18) generates character video signals in the form of horizontal scan lines corresponding to the codes. A line generator (30) generates line video signals corresponding to the underline bits. Where the apparatus is provided in a facsimile transmitter, the codes correspond to an identification of the station or the like and are entered into the memory (22) manually. Where the apparatus is provided in a facsimile receiver, the codes are received by a low speed modem (43) and stored in the memory (22). In either case, the receiver reproduces an original document in response to facsimile video signals with the identification characters, underlined where desired, superimposed on the document pattern.

7 Claims, 6 Drawing Figures

FACSIMILE APPARATUS

BACKGROUND OF THE INVENTION

The present invention relates to an apparatus for facsimile transmission and reception.

It is known in the art to transmit, in addition to facsimile video signals corresponding to a scanned original document, identification code signals indicating the transmitting station, the time of transmission, the telephone number of the transmitting station and the like. These code signals are generally transmitted prior to transmitting the facsimile pattern so that they will be printed on the top of the facsimile reproduction and attract the attention of the operator of the receiving station.

In the prior art a separate apparatus is required in both stations to accommodate the identification codes. At the receiver, the codes must be converted into video signals in the form of scan lines for printing by the plotter of the receiving station. This requires an unnecessarily complex and expensive arrangement.

It is often desirable to underline (or overline) particular characters for emphasis. In the prior art, the only method available for this capability is to transmit different codes for characters which are to be underlined and for characters which are not to be underlined. This results in twice the number of codes which must be decoded at the receiving end and a much more complex decoder.

It is possible to convert the codes into line scan video signals at the transmitter and transmit these signals directly. The receiver, even if not provided with special circuitry can reproduce the identification characters since they are in the same format as the facsimile video signals.

However, a problem exists in such an arrangement in that the high frequency bit signals are often lost in transmission over standard telephone lines or distorted due to noise in the line. Although the receiver is provided with circuitry to minimize amplitude and phase distortion and an AGC circuit, signal loss still occurs, especially in the first part of the transmission which corresponds to the identification information.

The identification information is provided at the top of the facsimile reproduction to attract the operator's attention. If this information is illegible, it will be impossible to identify the transmitting station and it will be further impossible to contact the transmitting station to request re-transmission.

One solution to this problem is to perform an error check such as a CRC check on each transmitted scan line. However, this greatly increases the time required for transmission and the cost and complexity of the receiving apparatus.

SUMMARY OF THE INVENTION

A facsimile apparatus embodying the present invention includes memory means for storing identification character codes and character generator means for generating character video signals corresponding to the codes, and is characterized in that each character code comprises information indicating whether a character corresponding to the code is to be underlined, the apparatus further comprising line generator means for sensing said information and generating underline video signals corresponding to positions under the characters to be underlined.

In accordance with the present invention, character codes having underline bits are read out of a memory. A character generator generates character video signals in the form of horizontal scan lines corresponding to the codes. A line generator generates line video signals corresponding to the underline bits. Where the apparatus is provided in a facsimile transmitter, the codes correspond to an identification of the station or the like and are entered into the memory manually. Where the apparatus is provided in a facsimile receiver, the codes are received by a low speed modem and stored in the memory. In either case, the receiver reproduces an original document in response to facsimile video signals with the identification characters, underlined where desired, superimposed on the document pattern.

It is an object of the present invention to provide a facsimile apparatus which enables selectively underlined identification characters to be printed on a facsimile reproduction with a simplified apparatus.

It is another object of the present invention to provide an improved facsimile apparatus which reduces data transmission errors using a simplified apparatus.

It is another object of the present invention to provide a generally improved facsimile apparatus.

Other objects together with the foregoing, are attained in the embodiments described in the following description and illustrated in the accompanying drawing.

DESCRIPTION OF THE PREFERRED EMBODIMENTS

While the facsimile apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
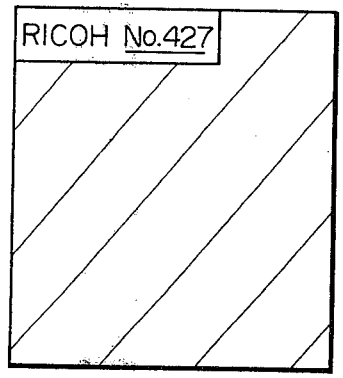
FIG. 1 is a diagram illustrating a facsimile reproduction in accordance with the present invention.

FIG. 1 of the drawing illustrates a facsimile reproduction in accordance with the present invention. A hatched area corresponds to a facsimile reproduction of an original document. Identification characters at the top of the reproduction indicate "RICOH NO. 427". It will be noted that "RICOH" is not underlined whereas "NO. 427" is underlined. The present invention makes it possible to underline all, none, or selected characters in the identification.

Figure 2:
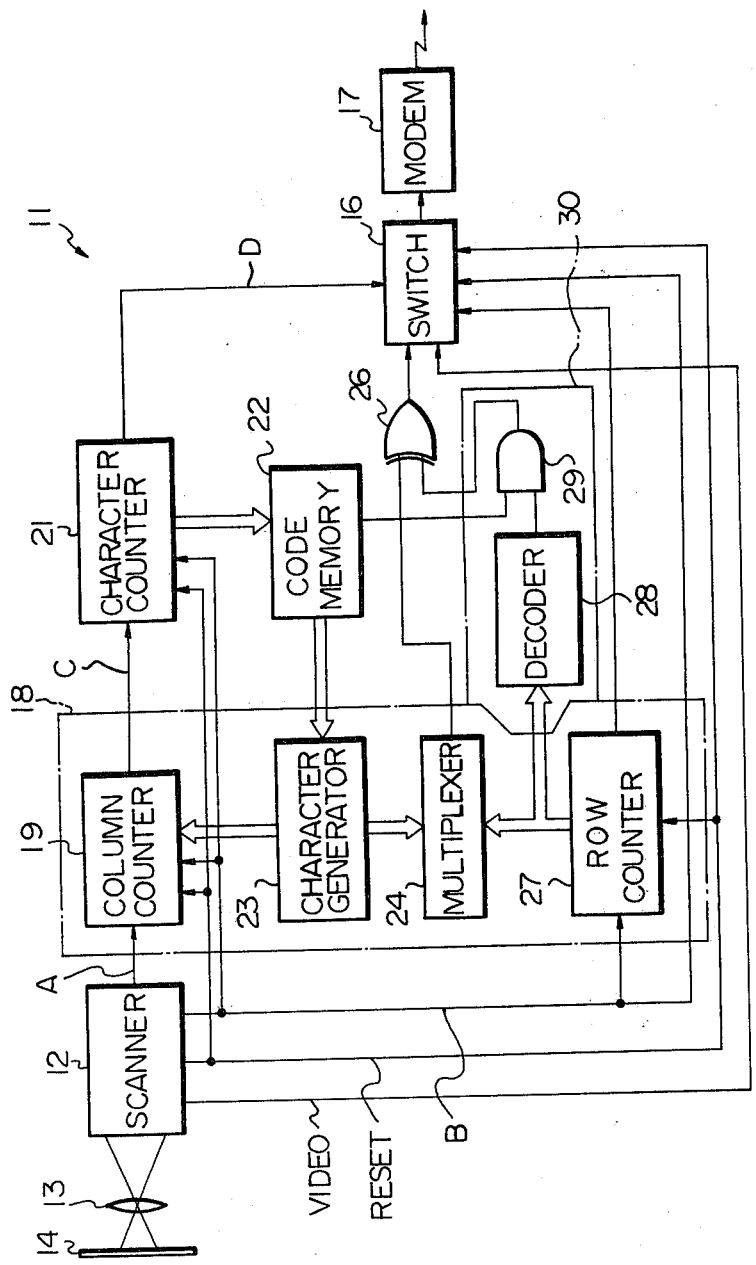
FIG. 2 is a block diagram of a facsimile apparatus embodying the present invention incorporated in a transmitter.

A facsimile apparatus embodying the present invention is shown in FIG. 2 and generally designated as 11. A scanner 12 having a lens 13 or the like scans an original document 14 and produces facsimile video signals corresponding to the horizontal scan lines of the image pattern. These signals are selectively fed through a switch 16 and modem 17 to remote receiver via a transmission link such as a telephone line.

The scanner 12 produces horizontal clock pulses A and vertical clock pulses B in addition to a reset signal at the beginning of scanning of the document 14. The scanning is horizontal, line by line. Each time a horizontal line or row is scanned, the document 14 is moved by an incremental distance and a next lower line is scanned.

A character video signal generator 18 comprises a column counter 19 for counting the horizontal clock pulses. The column counter 19 has a modulo of seven and produces an overflow signal C upon overflowing to the count of zero. The overflow signal C is applied to a character counter 21, the output of which is connected as an address input to a code memory 22. The output of the code memory 22 is connected to a character generator 23. The output of the column counter 19 is also connected to the character generator 23. The output of the character generator 23 is connected to a multiplexer 24, the output of which is connected to an input of an exclusive OR gate 26. The output of the gate 26 is connected to the switch 16.

The vertical clock pulses B are applied to a row or scan line counter 27 which has a modulo of eleven. The output of the row counter 27 is connected to the multiplexer 24 and also to a decoder 28 of a line video signal generator 30. The output of the decoder 28 is connected to an input of an AND gate 29, the output of which is connected to an input of the gate 26. An output of the code memory 22 is also applied to an input of the AND gate 29.

The identification codes representing "RICOH NO. 247" or another desired message which is to be printed at the top of the facsimile reproduction at the receiver are stored in the memory 22 by means of an input keyboard (not shown) or the like. The identification message is selected by the operator and manually stored in the memory 22 typically in the form of an eight bit code. The first seven bits may be in ASCII or other common format while the eighth bit indicates whether the character corresponding to the code is to be underlined. Although the following description applies to underlining, it will be understood that the principles of the present invention apply to overlining or the production of another mark corresponding to a respective character and are well within the scope of the present invention. The eighth bit output of the code memory 22 is applied to the input of the AND gate 29.

In operation, the scanner 12 generates the reset signal and begins scanning the document 14. The reset signal resets the counters 18, 21 and 27. The scanner 12 generates the horizontal clock pulses A in synchronism with scanning the respective horizontal bits of each scan line. The column counter 18 counts the pulses A and produces the overflow signals C which are counted by the character counter 21.

In response to the reset signal, the switch 16 gates the output of the gate 26 to the modem 17 for transmission. When the count in the counter 21 reaches a predetermined value corresponding to the beginning of the message area on the reproduction which also corresponds to the address of the memory location in the memory 22 containing the first character code, the code is applied to the character generator 23 from the memory 22. Prior to this time, the output signals of the switch 16 corresponded to a blank area because the outputs of the character generator 23 and multiplexer 24 were zero.

Figure 3:
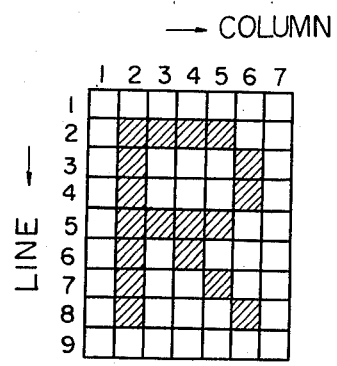
FIG. 3 is a diagram illustrating identification character reproduction without underlining.
Figure 4:
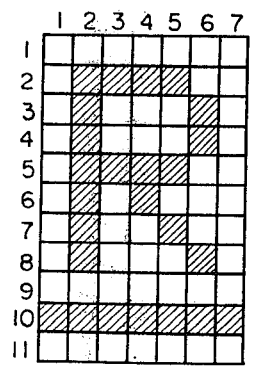
FIG. 4 is a diagram illustrating identification character reproduction with underlining.

At the time the first character code is applied to the character generator 23, the counts in the counters 19 and 27 are zero, indicating the first column of a character and the first scan line of the character respectively. As shown in FIG. 4, each character is allotted a space of seven columns and eleven lines. Columns two to six are used for the actual character area while columns one and seven are for intercharacter spaces. Rows or lines two to eight are used for the character area. Row ten is a blank space, row eleven is for an underline (where desired) and row eleven is for a blank space. Where underlining is not desired, the character appears as in FIG. 3.

In response to the zero count in the counter 19, the character generator 23 generates the first column of the first character in the memory 22. In response to the zero count in the counter 27, the multiplexer 24 gates therethrough the uppermost bit of the first column of the character. The decoder 28 produces a high output only when the count in the counter 27 is nine, corresponding to the underline position. Therefore, the output of the decoder 28 is low and the AND gate 29 is inhibited. The low output of the AND gate 29 applied to the exclusive OR gate 26 causes the gate 26 to function as a noninverting buffer and gate the output of the multiplexer 24 therethrough without alteration.

In response to the next horizontal clock pulse A, the column counter 19 is incremented and the character generator 23 generates the second column of the character. Since the count in the row counter 27 is still zero, the multiplexer 24 will gate therethrough the uppermost bit of the first line. This process continues for the third to seventh columns of the character so that the uppermost row or line of the character is generated and fed out the gate 26 and switch 16 for transmission.

In response to the eighth pulse A the counter 19 overflows to zero and produces the overflow or carry pulse C which increments the counter 21. This causes the memory 22 to output the second character code. The upper line of the second character will be generated and transmitted in the same manner as the upper line of the first character. This process continues until the upper scan lines or rows or all of the characters have been transmitted.

When the count in the counter 21 reaches a predetermined value indicating the end of the identification character area, the memory 21 produces a signal D which changes over the switch 16 to gate the output of the scanner 12 therethrough. This consists of the facsimile video signals for the first scan line. Alternatively, the memory 22 may store a predetermined code after the last identification character code and produce the signal D in response thereto.

As the scanner 12 begins to scan the next line of the document 14, it produces a vertical clock pulse B which resets the counters 19 and 21 and also causes the switch 16 to change over and gate the output of the gate 26 therethrough. The row counter 27 is incremented by the pulse B and causes the multiplexer 24 to gate the second rows of scan lines of the characters generated by the character generator 23 therethrough. The process described above is repeated with the exception that the second rows of the characters stored in the memory 22 are transmitted through the switch 16. It will be noted that the rows or scan lines of the characters stored in the memory 22 are transmitted in the same format as the facsimile video signals generated by the scanner 12.

The process is continued until the ninth rows (blank) of the characters are transmitted. In response to the next clock pulse B, the multiplexer 24 produces a zero or logically low output since it only has the capacity to accommodate nine scan lines. The decoder 28 produces a high output to enable the AND gate 29. The character codes are then sequentially read out in the same manner as for generating the characters. The eighth bit indicating whether or not to underline is applied to the AND gate 29. If the eighth bit is logically high, the output of the AND gate 29 will go high and be gated through the gate 26 and switch 16 as an underline video signal. If the eighth bit is logically low, indicating not to underline, the ouput of the AND gate 29, gate 26 and switch 16 will be logically low constituting a non-underline video signal.

In response to the next clock pulse B, the output of the decoder 28 goes low and a blank eleventh line of video signals is generated.

It will thus be understood that the objects of the present invention are accomplished and the character video signals are generated followed by the underline video signals by means of a simple circuit arrangement.

In response to the next clock pulse B, the counter 27 overflows and the scanner 12 produces another reset signal which causes the switch 16 to gate the facsimile video data therethrough.

It is possible to provide more than one line of characters by providing additional bits for the row counter and additional memory capacity in the memory 22. The additional bits in the row counter 27 would count the number of times the counter 27 overflows and use this count as a high order address bit input for the memory 22.

Although not illustrated, a data compressor using, for example, run length encoding may be provided between the switch 16 and modem 17.

The present apparatus 11 is shown and described as comprising discrete counters, etc. However, some or all of the operational units may be synthesized in a digital computer comprising a central processing unit, read only memory, random access memory and the like in the form of software.

Figure 5:
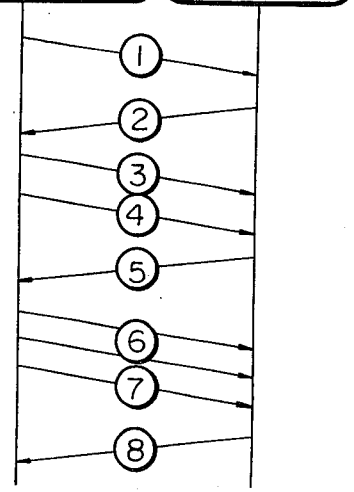
FIG. 5 is a diagram illustrating facsimile transmission procedure.
Figure 6:
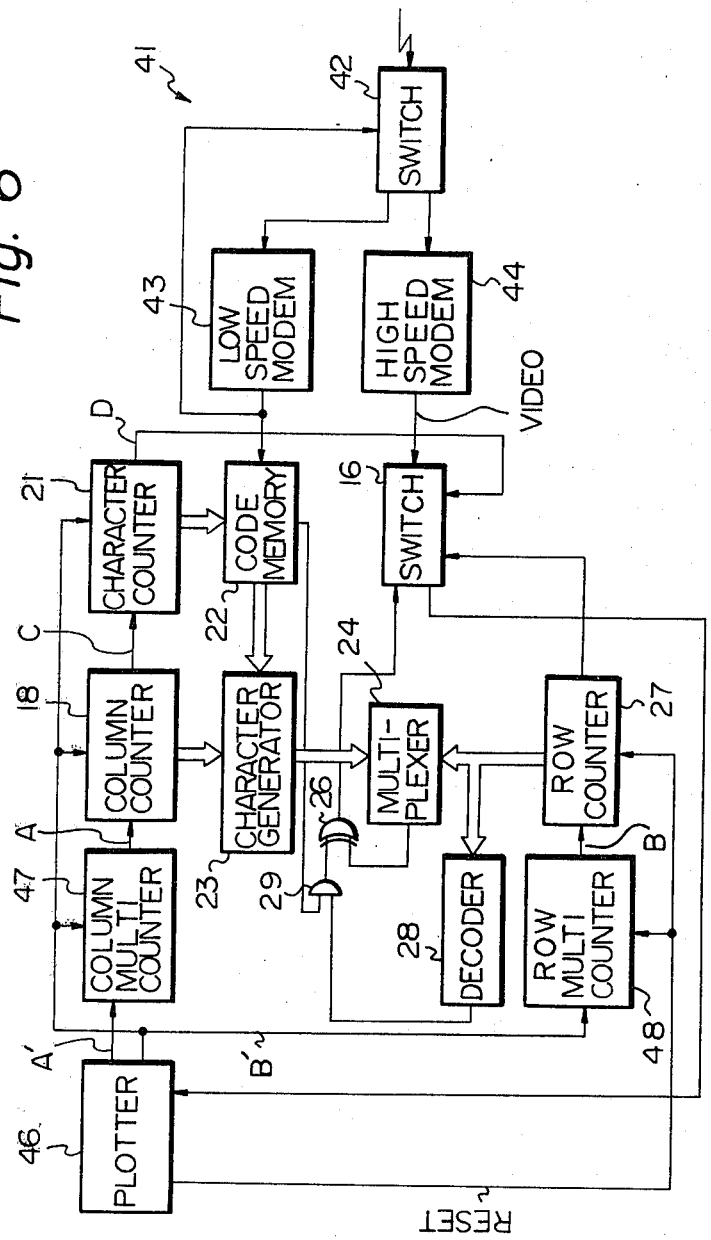
FIG. 6 is a block diagram of the present apparatus incorporated in a receiver.

The present apparatus may also be incorporated into a facsimile receiver as shown in FIGS. 5 and 6. In this case, the identification codes are transmitted to the receiver in ASCII or similar format by means of a low speed modem. The communication procedures are illustrated in FIG. 5.

1. The transmitting station operator places the document to be transmitted in the scanner and enters the identification code into the apparatus by means of a keyboard or the like. Then, the operator dials the telephone number of the desired receiving station. Alternatively, the receiving station may telephone the transmitting station and request transmission of a particular document.
2. Upon connection of the telephone circuit, the receiving station transmits data indicating its receiving capabilities through a low speed modem (Baud rates, line density, etc).
3. The transmitting station selects the highest priority receiving capabilities of the receiving station and transmits data indicating these capabilities in addition to document size to the receiving station which sets these modes and prepares for reception. In addition, the transmitting station transmits the identification codes which the receiving station stores in a code memory. All of this data is transmitted in code form through low speed modems. Then, the receiving station prepares to receive facsimile video data through a high speed modem.
4. The transmitting station transmits test data through the high speed modem to test matching of the transmission line. The test data has a predetermined binary pattern which the receiving station checks for signal level, bit error, etc.
5. The receiving station notifies the transmitting station whether or not is capable of receiving satisfactory data through the low speed modem.
6. If the receiving station can receive data, the transmitting station transmits the facsimile video signals through the high speed modem which are received by the receiving station through the high speed modem. The identification character information is printed on the facsimile reproduction before reception of the facsimile data or simultaneously therewith. If the receiving station cannot receive data, handshaking and lowering of the priority of the transmission modes are carried out until satisfactory data transmission is possible.
7. After completion of transmission of the facsimile data, the transmitting station transmits a post message indicating whether another document is to be transmitted. This data is transmitted through the high speed modem.
8. The receiving station informs the transmitting station through the low speed modem that reception has been completed and that the receiving station is ready to receive another transmission if indicated.

In the multi-page transmission mode, the identification data may be printed on each page or only on the first page if desired. In the former case, the identification message may comprise a page number.

It will be noted that since the identification character codes are transmitted through the low speed modem, the transmission quality is very high and bit errors are low. In spite of this, the transmission speed of the codes is very high. Even higher reliability may be achieved without a significant increase in transmission time by transmitting the identification codes a plurality of times. Majority logic means means may be incorporated into the receiver to ensure accurate identification of the codes. It will be noted that the identification codes only have to be transmitted following a first page.

FIG. 6 illustrates the present apparatus incorporated into a receiver which is generally designated by the reference numeral 41. Incoming data and identification codes are applied to a switch 42. The identification codes are gated by the switch 42 through a low speed modem 43 to the code memory 22. Like elements are designated by the same reference numerals used in FIG. 2. The facsimile video signals representing the document are applied through the switch 42 to the switch 16 through a high speed modem 44.

In this case, clock pulses A' and B' as well as the reset signal are generated by a plotter 46 which reproduces the original document and identification characters in response to the facsimile video signals and the character video signals respectively. The clock pulses A' and B' are frequency divided by a column multi counter 47 and a row multi counter 48 respectively to obtain the pulses A and B. The counter 47 controls the vertical size of the identification characters whereas the row multi counter 48 controls the horizontal size. The counters 47 and 48 comprise variable frequency dividers. If, for example, it is desired to enlarge the characters by a factor of four, each of the counters 47 and 48 will have a frequency division ratio of four. In this manner, each dot will be printed or plotted in four consecutive column positions and four consecutive row positions.

The operation of the apparatus 41 is the same as for the apparatus 11 except that the output of the switch 16 is connected to the input of the plotter 46 rather than to the input of the modem 17.

In the embodiment of FIG. 2, character video signals are generated corresponding to character codes and the character video signals are transmitted in addition to line video signals. In the embodiment of FIG. 2, the codes themselves are transmitted containing the underline bits and the character and line video signals generated at the receiver. In the apparatus of FIG. 2, the identification characters and underlines may be received by an unmodified facsimile receiver.

In summary, it will be seen that the present invention overcomes the drawbacks of the prior art and provides an improved facsimile transceiver enabling identification code underlining and reduced data error using a simple circuit arrangement. Various modifications will become possible for those skilled in the art after receiving the teachings of the present disclosure without departing from the scope thereof.

What is claimed is:

1. A facsimile apparatus including memory means for storing identification character codes and character generator means for generating character video signals corresponding to the codes, characterized in that each character code comprises information indicating whether a character corresponding to the code is to be underlined, the apparatus further comprising:

line generator means for sensing said information and generating underline video signals corresponding to positions under the characters to be underlined;

facsimile means for producing facsimile video signals; and switch means for selectively passing therethrough the character video signals and underline video signals in combination or the facsimile video signals.

2. An apparatus as in claim 1, in which each code comprises a plurality of code bits and an underline bit, the line generator means generating the underline video signals when the respective underline bits have predetermined logical states.

3. An apparatus as in claim 1, further comprising read means for reading the codes out of the memory means and applying the codes to the character generator means.

4. An apparatus as in claim 2, in which the character generator means is constructed to generate the character video signals in a form of scan lines, the character generator means comprising line counter means for counting scan lines, the line generator means generating the underline video signals only when a count in the line counter means has a predetermined value corresponding to an underline position.

5. An apparatus as in claim 1, further comprising transmission means for transmitting the character video signals and the underline video signals.

6. An apparatus as in claim 1, further comprising reception means for receiving the codes and storing the codes in the memory means.

7. An apparatus as in claim 6, further comprising plotter means for reproducing an original document in reponse to the facsimile video signals with identification characters and underlines corresponding to the character video signals and line video signals respectively superimposed thereon in response to the character video signals and the line video signals.

* * * * *